(12) United States Patent
Hirsch et al.

(10) Patent No.: US 9,859,958 B2
(45) Date of Patent: Jan. 2, 2018

(54) FREQUENCY ESTIMATOR FOR AERONAUTICAL COMMUNICATION

(71) Applicant: THALES, Courbevoie (FR)

(72) Inventors: Antonin Hirsch, Toulouse (FR); Mathieu Arnaud, Toulouse (FR); Pierre-Alexandre Rosset, Toulouse (FR); Khaled Zouitane, Houilles (FR)

(73) Assignee: Thales, Courbevoie (FR)

( * ) Notice: Subject to any disclaimer, the term of this patent is extended or adjusted under 35 U.S.C. 154(b) by 137 days.

(21) Appl. No.: 14/699,353

(22) Filed: Apr. 29, 2015

(65) Prior Publication Data

US 2015/0318903 A1    Nov. 5, 2015

(30) Foreign Application Priority Data

Apr. 30, 2014    (FR) .................................... 14 01007

(51) Int. Cl.
*H04B 7/01* (2006.01)
*H04B 7/185* (2006.01)
*H04L 25/02* (2006.01)
*H04W 56/00* (2009.01)

(52) U.S. Cl.
CPC .......... *H04B 7/01* (2013.01); *H04B 7/18513* (2013.01); *H04L 25/0238* (2013.01); *H04W 56/0035* (2013.01); *H04B 7/18506* (2013.01)

(58) Field of Classification Search
CPC .. H04B 7/01; H04B 7/18513; H04B 7/18506; H04W 56/0035; H04L 25/0238
See application file for complete search history.

(56) References Cited

U.S. PATENT DOCUMENTS

2008/0211719 A1    9/2008  Zhang
2010/0171659 A1*   7/2010  Waters ................... H04B 17/24
                                            342/357.74

OTHER PUBLICATIONS

Chang D. Ryu, et al., "Hardware Efficient Frequency Estimator Based on Data-Aided Algorithm for Digital Video Broadcasting System", IEEE Asia Pacific Conference on Circuits and Systems, Nov. 30, 2008, pp. 890-893, IEEE, Piscataway, NJ, USA, XP031405139.

\* cited by examiner

*Primary Examiner* — Ricky Ngo
*Assistant Examiner* — Lan Huong Truong
(74) *Attorney, Agent, or Firm* — Baker Hostetler LLP

(57) ABSTRACT

A method and device are provided suited to estimating a frequency value for aeronautical communication between a first station and an airborne system moving in relation to the first station, the data being transmitted in the form of a succession of frames, a frame comprising at least one first header field of known data followed by one or more fields of unknown data, and having at least the following steps: Step 1: performance of a supervised correlation on the known data (300) of the header, and estimation of a first frequency range centered on a frequency $\widetilde{\Delta f_{DA}}$; Step 2: production of a blind correlation on at least all of the unknown data of a field of data, by looking for a correlation peak over the frequency range $\widetilde{\Delta f_{DA}} +/- \widetilde{\Delta f}$, as determined in step 1, and by retaining of the frequency corresponding to the correlation peak.

14 Claims, 3 Drawing Sheets

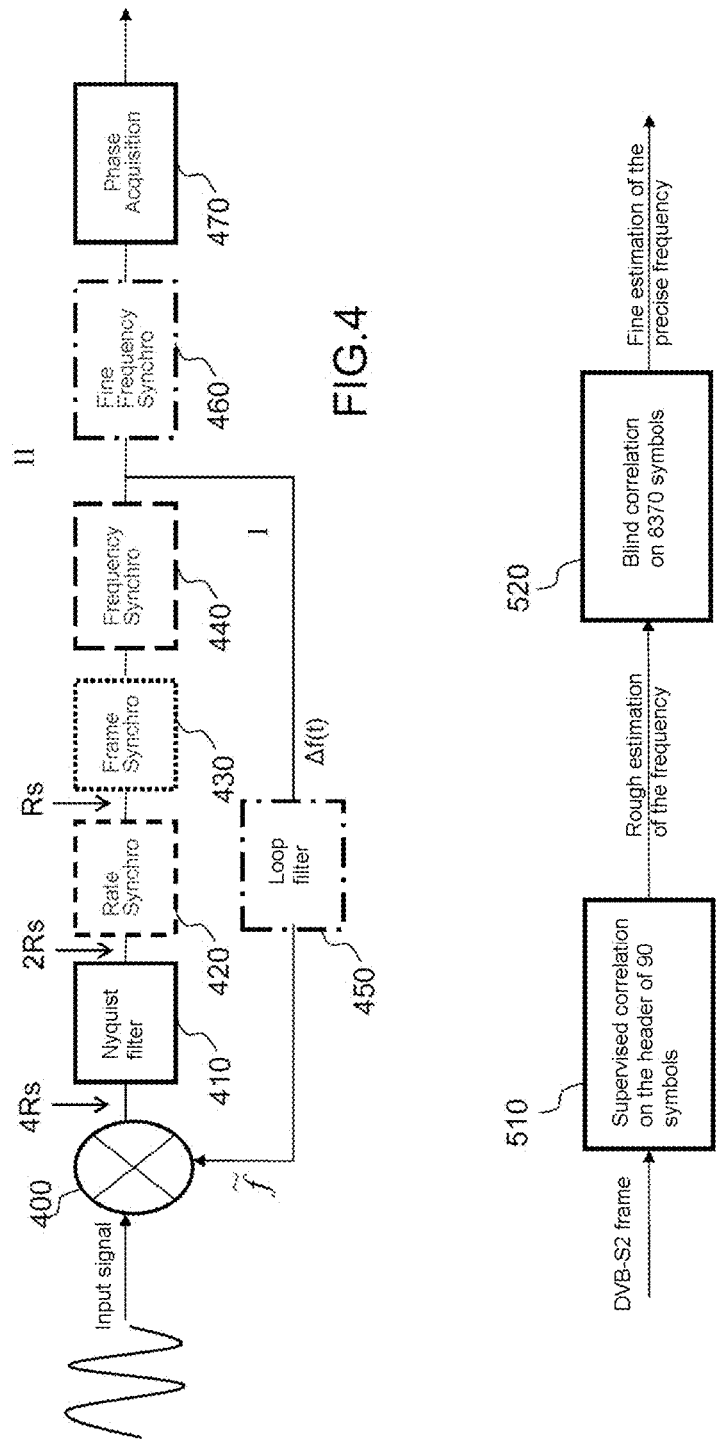

FREQUENCY ESTIMATOR FOR AERONAUTICAL COMMUNICATION

CROSS-REFERENCE TO RELATED APPLICATION

This application claims priority to foreign French patent application No. FR 1401007, filed on Apr. 30, 2014, the disclosure of which is incorporated by reference in its entirety.

FIELD OF THE INVENTION

The invention concerns a frequency estimator for transmitting and receiving data in real time under aeronautical conditions, for example based on the DVB-S2 standard, or an equivalent format. It can be used to estimate a frequency shift caused by the Doppler effect in a sufficiently precise manner within a low signal-to-noise ratio context and with high Doppler accelerations.

BACKGROUND

The invention concerns the problem of frequency synchronization within an airborne context, notably exhibiting low signal-to-noise ratios and Doppler accelerations that can reach values that are considered high in the field. The Doppler effect is caused by the movement of the aeroplane in relation to the satellite, and the aeronautical channel is perturbed by the frequency shift in the received carrier, called the Doppler effect.

FIG. 1 schematically shows a transmission system having a ground station, 1, a satellite 2 and an airborne system 3 or aeroplane. The outbound path $L_a$ is defined as the one that goes from the ground station 1 to the airborne system, such as an aeroplane; the return path $L_r$ is defined as the path that goes from the aeroplane 3 to the ground station 1, via the satellite 2. The Doppler effect is caused by the movement of the aeroplane 3 in relation to the satellite 2. It is possible to link the Doppler effect and the Doppler effect variation to the speed and acceleration of the aeroplane.

Let $f_{em}$ be the frequency of the transmitting system and $v_{em}$ be the speed thereof, $f_{rec}$ be the frequency of the receiver and $v_{rec}$ be the speed thereof. The relationship between the two frequencies can then be expressed as a function of the speed c of light:

$$f_{rec} = \frac{c - v_{rec}}{c - v_{em}} f_{em}$$

The satellite being able to be considered to be immobile vis-à-vis the aeroplane, the following is obtained for the frequency difference $\Delta f$ between the transmitter and the receiver:

$$f_{em} - f_{rec} = \Delta f = \frac{v_{rec}}{c} f_{em}$$

It is then possible to link $D_{max}$, the maximum Doppler effect, and $V_{max}$, the maximum variation in the Doppler effect, to $S_{max}$, the maximum speed of the aeroplane, and $A_{max}$, the maximum acceleration of the aeroplane, in the following manner:

$$D_{max} = \frac{S_{max}}{c} f_{em} \text{ expressed in Hz}$$

$$V_{max} = \frac{f_{em}}{c} A_{max} \text{ expressed in Hz/s}$$

The <<worst case>> aeronautical conditions that are considered here are as follows:
 a maximum speed of the aeroplane of 0.97 Mach, corresponding to the cruise speed of an airliner,
 a maximum acceleration of the aeroplane of 2 g, corresponding to the maximum acceleration that can be reached by an airliner during:
  take off and landing oriented in the direction of the satellite,
  a tight turn with the radial acceleration oriented in the direction of the satellite,
  an air pocket with the satellite at the zenith in relation to the aeroplane.
  The two graphs in FIGS. 2A and 2B show the acceleration A and the variation in altitude Alt in the presence of an air pocket, and the Doppler effect D and the variation in Doppler effect, induced curve V, respectively.

The radio-frequency RF transmission characteristics are as follows:
 a maximum carrier frequency fixed at 30 GHz, typical of the Ka band, the highest frequency range used in telecommunication satellites,
 a minimum symbol rate, fixed at 1 Mbaud, corresponding to the minimum symbol rates used in satellite communications in the Ka band.

The following values are determined for the maximum Doppler effect $D_{max}$ and the maximum variation in the Doppler effect $V_{max}$:

$$D_{max} = 33 \text{ kHz and } V_{max} = 1962 \text{ Hz/s}.$$

By normalising these values in relation to the symbol rate $R_s$ of the frame, the normalised maximum Doppler $D_{max}^{norm}$ and the normalised Doppler variation $V_{max}^{norm}$ are obtained:

$$\begin{cases} D_{max}^{norm} = \dfrac{D_{max}}{R_S} \\ V_{max}^{norm} = \dfrac{V_{max}}{R_S^2} \end{cases}$$

$D_{max}^{norm} = 0.033 \text{symb}^{-1}$ and $V_{max}^{norm} = 1.962 * 10^{-9} \text{symbs}^{-2}$ $R_S$: symbols/s; $V_{max}$: (Hz·s$^{-1}$); $D_{max}^{norm}$: symbs$^{-1}$, $V_{max}^{norm}$: symbs$^{-2}$.

FIG. 3 shows the structure of a DVB-S2 frame made up of a header of 90 symbols, 300, of a first block $301_1$ of 1440 data symbols followed by a first block $302_1$ of pilots of 36 symbols, then a second block $301_2$ of 1440 data symbols followed by a second block $302_2$ of pilots of 36 symbols, and so on.

Within the aeronautical context, in the Ka band, the standardised structure of DVB-S2 frames that is associated with the frequency synchronisation mechanisms recommended in the ETSI directives TR 102 376 V1.1.1, "Technical Report, DVB, User Guidelines for the second generation system for Broadcasting, Interactive Services, News Gathering and other Broadband Satellite Applications DVB- S2", does not allow operation for low symbol rates, lower than 5 Mbaud, for a signal-to-noise ratio lower than 5 dB, a value typical of the field.

In this instance of application, the maximum residual Doppler after Doppler estimation must bring about a maximum phase shift of $\pi$ between two pilot blocks in order to prevent phase ambiguities. This involves a maximum frequency resolution $\Delta_f^{Max}$ equal to:

$$\Delta_f^{Max} = \frac{\pi}{2*\pi*(1440+36)} * R_s = \frac{1}{2*1476} * R_s = 3.38*10^{-4} * R_s$$

with 1440 data symbols, 36 pilot symbols for the DVB-S2 frame.

FIG. 4 schematically shows an example of frequency estimation according to the prior art at a receiver. The frequency synchronisation of the signal takes place in two steps, a first rough synchronisation being effected by a looped structure I and a second, finer synchronisation being effected in open-loop or "feed-forward" control mode, II. The input signal received by the receiver enters a mixer 400 that also receives the estimated frequency value allowing a correction of the frequency when the device is operating. The signal is passed through an outfit comprising a Nyquist filter block, 410, a rate synchronisation module 420, a frame synchronisation module 430 and a first frequency synchronisation module 440, the output of which is connected firstly to a fine synchronisation module 406 followed by a phase acquisition module 470 and secondly to a loop filter 460.

The loop synchronisation scheme I comprises the frequency synchronisation module 440 and the module 450 of the loop filter. The frequency synchronisation module performs an estimation of the frequency of the signal $\tilde{f}$ according to the formula:

$$\tilde{f} = \arg(z_k z^*_{k-2})$$

where $z_k = r_k a^*_k$, where $r_k$ is the data sample r received at the instant k, $a^*_k$ is the conjugate of the reference symbol at this same instant k and arg is the argument from a complex number. This estimation, which is very sensitive to noise, is then filtered by the first-order loop filter, and then injected as an input correction for the Nyquist reception filter.

The loop bandwidth of the loop filter is a determining parameter in the process of first frequency synchronisation:
  it is proportional to the speed of convergence of the synchronisation,
  it is likewise proportional to the sensitivity of the estimation to noise.

In summary, the wider the loop band, the more rapidly it converges on the shift in frequency, but at the same time it is more sensitive to the noise level.

The next, fine synchronisation block 440 effects a second estimation of the frequency of the signal by using an algorithm operating in supervised mode: it uses the reference fields of the DVB-S2 frame (header and pilots) in order to effect its estimation.

For the record, it is possible to estimate the autocorrelation R(m) of a signal x for an index m by means of $R_l(m)$ over a sequence of magnitude N:

$$R_l(m) = \frac{1}{N-m} \sum_{k=m+1}^{N} x(k)x^*(k-m)$$

The supervised algorithm from the Luise & Reggianini algorithm known to a person skilled in the art averages these correlations over a number L of pilot blocks. The correlations are effected over half of the length of a pilot block $$N = \frac{L_0}{2},$$

where $L_0$ is the length of a pilot block:

$$\tilde{f} = \frac{1}{\pi T_s(N+1)} \arg\left(\sum_{l=1}^{L} \sum_{m=1}^{N} R_l(m)\right), \text{ where}$$

$T_s$ symbol time
$L_0$: length of a pilot block
i: index of the estimate of the autocorrelation
N: $L_0/2$: number of autocorrelations produced by a pilot block
I: index of the pilot block
L: number of pilot blocks on which the frequency estimate is produced.

This frequency correction gives rise to a second compromise concerning the value of the number L of pilot blocks over which to average the correlations: it is proportional to the precision of the estimate, and is inversely proportional to its reactivity.

However, such a scheme does not allow an adjustment for the frequency synchronisation to be found that allows notably the frequency variations of the aeronautical channel to be followed, and a sufficiently precise frequency estimation to be provided, even with a low signal-to-noise ratio, 0 dB. The frequency differences between the estimated frequency $\tilde{f}$ and the real frequency $f_{reel}$ can appear and be at the origin of dropouts and hence frame losses during communication.

The known estimators of the prior art are generally based on supervised algorithms using known information, such as the header and the pilot blocks of the DVB-S2 frame, which does not allow the conjugate of an estimate of the Doppler that is sufficiently precise to operate according to the DVB-S2 standard and sufficient reactivity in order to withstand the substantial Doppler variations owing to the movement of the aeroplane.

The document by RYU et al. entitled "Hardware efficient frequency estimator based on data-aided algorithm for digital video broadcasting system" describes a looped DA estimator that is averaged over time.

The document US 2008/0211719 describes an algorithm for estimating the blind frequency using the pilots.

SUMMARY OF THE INVENTION

The device that is the subject matter of the invention uses, notably firstly, a supervised frequency estimator on the header of known data in order to deduce therefrom a rough estimate of the frequency $\widetilde{\Delta fDA}$, which is precise to +/− $\widetilde{\Delta f}$. Secondly, the device will estimate the frequency precisely by executing a blind algorithm on all of the unknown data over a search range corresponding to a range around the estimated frequency $\widetilde{\Delta fDA}$ during the first step. This advantageously allows combination of the robustness of a supervised estimation and the precision of a blind estimation and allows a very precise estimate of the frequency to be obtained over a very short estimation period and thus allows very large variations owing to the movement of the aeroplane to be followed.

The expression "blind algorithm" denotes, in the present description, an algorithm using the data that are unknown by nature that are transmitted in the communication frame. A supervised algorithm will work on known data.

The invention concerns a method for estimating a frequency value for aeronautical communication between a first station and an airborne system moving in relation to the first station, the data being transmitted in the form of a succession of frames, a frame comprising at least one first header field of known data, followed by one or more fields of unknown data, comprising at least the following steps:

Step 1: performance of a supervised correlation on the known data of the header, and estimation of a first frequency range centred on an estimated frequency $\widetilde{\Delta fDA}$, having a precision of $+/-\widetilde{\Delta f}$, Step 2: production of a blind correlation on at least all of the unknown data of a field of data by looking for a correlation peak over the range centred on the frequency $\widetilde{\Delta fDA} +/- \widetilde{\Delta f}$, as determined in step 1, and retain the frequency corresponding to the correlation peak.

According to a variant embodiment, the frame is a frame of DVB-S2 type that is modulated with a modulation by change of phase comprising a field of pilots that is arranged before a field of data and comprising at least the following steps:

Step 1: performance of a supervised correlation by Fourier transform on the DVB-S2 header, in order to obtain a range centred on an estimated frequency $\widetilde{\Delta fDA}$ having a precision of $+/-\widetilde{\Delta f}$, Step 2: use of the symbols of the modulated frame and use of the Fourier transform from the modulated symbols of the short frame that are raised to the power of 4, corresponding to the range centred on the frequency $\widetilde{\Delta fDA} +/- \widetilde{\Delta f}$ defined in step 1, determination of the frequency corresponding to the maximum of the norm of the Fourier transform and deduction of the value of the Doppler effect therefrom.

The method may have the following steps:

Step 1: estimation of the frequency $\widetilde{\Delta fDA}$, $$\widetilde{\Delta fDA} = MaxIndex(|DFT(R(k)*conj(Ref(k)) + BABG(k))|^2) =$$
$$MaxIndex(|DFT(e^{i*2*\pi*\Delta_f*t} * rect_{90}(t) + BABG(t))|^2) =$$
$$MaxIndex(|sinc_{90*\pi}(f - \Delta_f) + BABG(f)|^2)$$

where:
conj( ): conjugate function of a complex number
DFT: Fourier transform
k: index of a symbol
t: given instant
$\Delta_f$: Doppler frequency to be estimated
$rect_{90}(t)$: rectangle function of length 90
$sin\ c_{90}*_\pi(f)$: cardinal sine function of width $90*\pi$
Ref(k): reference symbols for the received symbols R(k) of the header where $1 \leq k \leq 90$
BABG: Gaussian additive white noise.

Step 2: estimation of the value of the Doppler from the expression $$\widetilde{\Delta f NDA} = \frac{MaxIndexNDA(|DFT((R(k) + BABGEq(k))^4)|^2)}{4} =$$
$$\frac{MaxIndexNDA\left(\left|\begin{array}{c}DFT(e^{i*2*\pi*4*\Delta_f*t} * rect_{NDALength}(t) + \\ BABGEq(t))\end{array}\right|^2\right)}{4} =$$
$$\frac{MaxIndexNDA(|sinc_{NDALength*\pi}(f - 4*\Delta_f) + BABGEq(f)|^2)}{4}$$

where:
NDALength: length over which the blind frequency estimate is produced,
$Rect_{NDALength}(t)$: rectangle function of length NDALength,
$Sin\ c_{NDALength}*_{90}(f)$: cardinal sine function of width $NDALength*\pi$,
BABGeq(f): equivalent Gaussian additive white noise stemming from raising to the power of 4 the noisy signal SymbsQPSK+BABG,
MaxIndexNDA: frequency belonging to the frequency range plageFreqNDA=$\widetilde{\Delta fDA} +/- \widetilde{\Delta f}$ for which the norm of the Fourier transform is at a maximum.

By way of example, the frame is modulated by BPSK or QPSK modulation and the value of NDALength is fixed at 8370 for an SNR of 0 dB.

The steps of the method apply to an NDALength equal to $$\frac{8370}{SNRLin^2},$$

where SNRLin corresponds to the signal-to-noise ratio SNR expressed linearly.

According to an embodiment, a frequency estimate is determined for each DVB-S2 frame constituting the communication.

The invention also concerns a device for estimating a Doppler in an aeronautical communication system comprising at least a first station and an airborne system moving in relation to the first station, the data being transmitted in the form of a succession of frames, a frame comprising at least one first header field of known data followed by one or more fields of unknown data, the device comprising at least:
a first module that is suited to producing a supervised correlation on the known data of the header, and to estimating a first frequency range centred on a frequency $\widetilde{\Delta fDA}$ having a precision of $+/-\widetilde{\Delta f}$,
a second module that is suited to producing a blind correlation on at least all of the unknown data of a field of data by looking for a correlation peak over the frequency range $\widetilde{\Delta fDA} +/- \widetilde{\Delta f}$, as determined in step 1, and by retaining the frequency corresponding to the correlation peak.

The data are QPSK- or BPSK-modulated DVB-S2 data.

The first estimation module and the second module are produced using FPGA technology, for example.

BRIEF DESCRIPTION OF THE DRAWINGS

Other features and advantages of the present invention will be better understood upon reading the description that follows, which is provided by way of illustration and is no way limiting, to which the figures are appended, in which:

FIG. 4 shows an example of synchronisation structure according to the prior art, FIG. 5 shows an example of the structure of the frequency estimator according to the invention, arranged at a DVB-S2 receiver.

DETAILED DESCRIPTION

Figure 1:
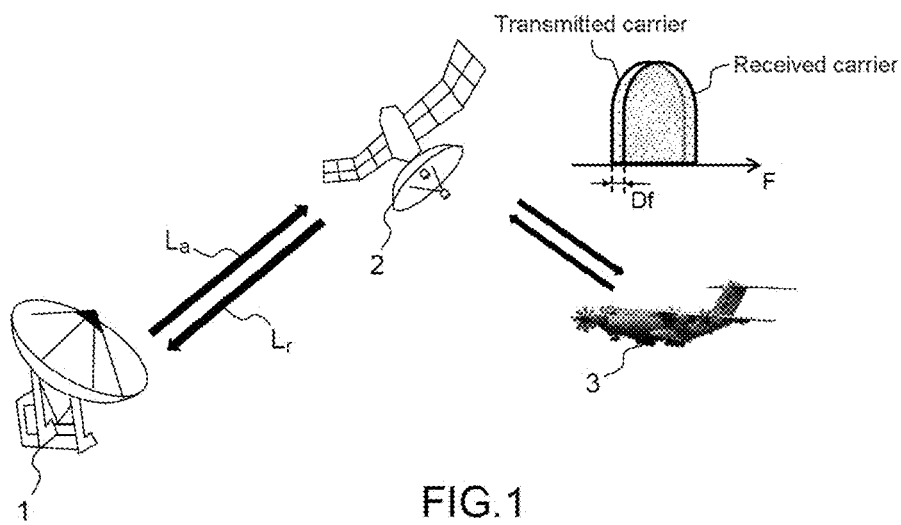
FIG. 1 shows an example of a transmission system.
Figure 3:
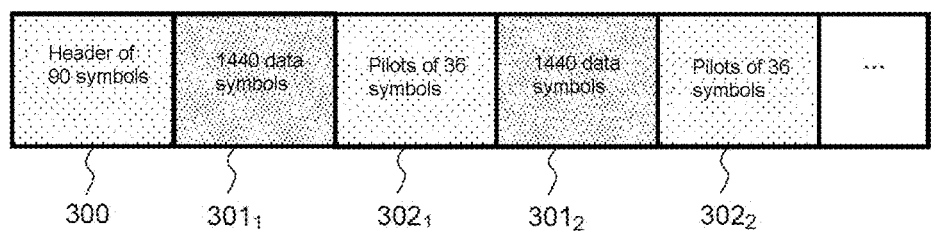
FIG. 3 shows a DVB-S2 frame.
Figure 2A:
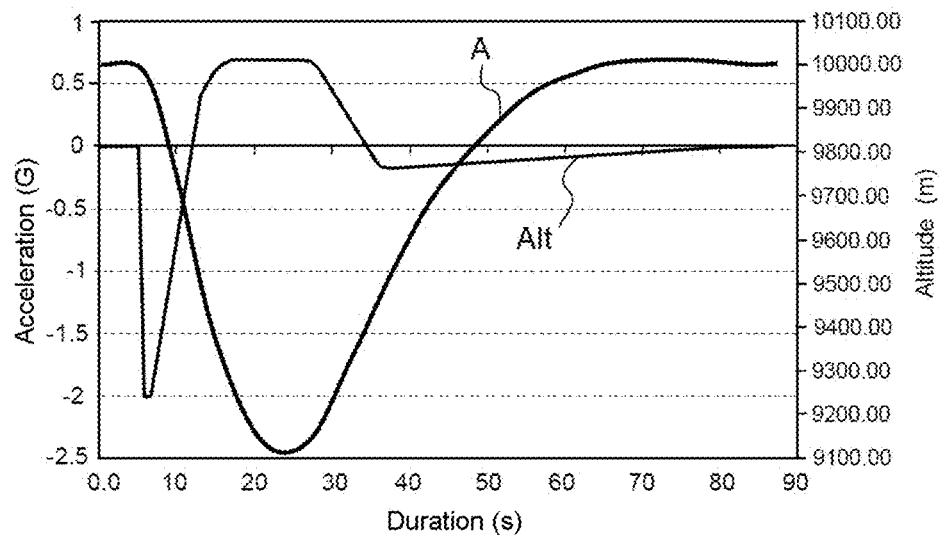
FIG. 2A and FIG. 2B respectively show an illustration of the acceleration A and the variation in altitude Alt in the presence of an air pocket and the Doppler effect D and the variation in Doppler effect, induced curve V.
Figure 2B:
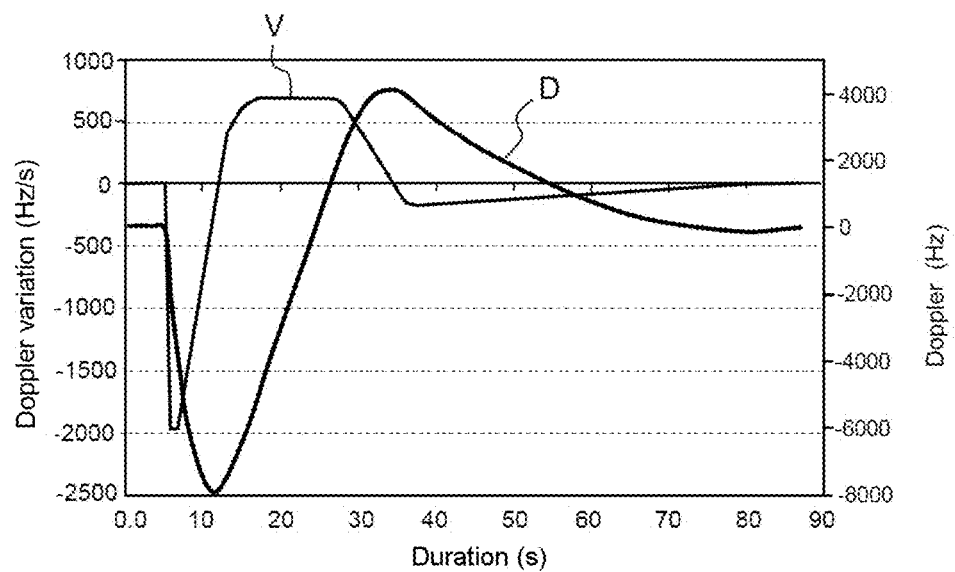

The example that follows will be given for the frequency estimation, bursty or otherwise, in the case of a DVB-S2 frame with modulation by means of QPSK (Quadrature Phase Shift Keying) phase change, in order to better explain the subject matter of the invention, and without limiting the scope thereof to the structure of the DVB-S2 frame. The invention can also apply for communications for which the frames used have a header or field of known data followed by a plurality of fields of unknown data. By way of example, the unknown data are BPSK (Binary Phase Shift Keying) modulated, or QPSK modulated. In the detailed example below, the system will work for signal-to-noise ratios of between 0 and 6 dB, for example, in order to comply with the known Arinc 791 norm.

The method and the frequency estimator according to the invention have a first supervised frequency estimator and a second blind frequency estimator. The frequency estimator according to the invention is implemented within a DVB-S2 receiver that is positioned, by way of example, at the satellite station or the ground station and uses programmable circuit or FPGA (field-programmable gate array) technology, for example.

The first frequency estimation module or first estimator implements an algorithm that produces a supervised correlation using a Fourier transform on the DVB-S2 header of 90 symbols.

The algorithm estimates the frequency by computing the frequency corresponding to the maximum of the norm of the Fourier transform of the 90 symbols (R(k) where 1≤k≤90) that are received from the DVB-S2 header and correlated with the reference symbols (Ref(k) where 1≤k≤90) of this same header.

The received symbols k are as follows:

$R(k)=(\text{Ref}(k)+\text{AWGN}(k))*\exp(i*2*\pi\Delta_f*k)$, where:

Ref(k): reference symbols for the symbols R(k)
BABG: additive white Gaussian noise
$\Delta_f$: Doppler frequency to be estimated.

The frequency estimation $\widetilde{\Delta fDA}$ at the first estimation module or estimator is effected as follows:

$$\widetilde{\Delta fDA} = MaxIndex(|DFT(R(k)*conj(Ref(k))+BABG(k))|^2) =$$
$$MaxIndex(|DFT(e^{i*2*\pi*\Delta_f*t}*rect_{90}(t)+BABG(t))|^2) =$$
$$MaxIndex(|sinc_{90*\pi}(f-\Delta_f)+BABG(f)|^2)$$

where:
conj( ): conjugate function of a complex number
DFT: Fourier transform
k: index of a symbol
t: given instant f: given frequency
$\Delta_f$: Doppler frequency to be estimated
$rect_{90}(t)$: rectangle function of length 90
$\sin c_{90}*_\pi(f)$: cardinal sine function of width 90*π.

The operating range is no more than +−0.5*Rs, because it is a supervised estimator.

At the conclusion of the first estimation module, exhibiting high resistance to noise, a frequency value $\widetilde{\Delta fDA}$ is obtained.

The second estimation module or second estimator is a blind frequency estimator with very high frequency resolution that will work on the following frequency range:

FreqRangeNDA=$[\widetilde{\Delta fDA} - \widetilde{\Delta f} ; \widetilde{\Delta fDA} + \widetilde{\Delta f}]$ This frequency range over which the maximum peak is sought is determined by the precision of the supervised frequency estimator: it is therefore centred on $\widetilde{\Delta fDA}$ and is ±0.0025 Rs in normalised mode (2.5 kHz for an $R_s$ of 1 Mbaud), which corresponds to the worst-case precision of the supervised estimator at 0 dB. Thus, at 0 dB:

FreqRangeNDA=$[\widetilde{\Delta fDA} - 0.0025; \widetilde{\Delta fDA} + 0.0025]$ When the SNR is 0 dB, the blind algorithm uses all the symbols of the short QPSK frame with pilots, that is to say 8370 symbols. The algorithm involves, at 0 dB, using the Fourier transform for the 8370 QPSK symbols raised to the power of 4 in order to estimate the Doppler by computing the frequency f corresponding to the maximum of the norm of this Fourier transform. The Doppler corresponds to this estimated frequency divided by 4. If the received QPSK symbols R(k) are considered, where 1≤k≤NDALength:

$R(k)=(\text{SymbsQPSK}(k)+BABG(k))*\exp(i*2*\pi\Delta_f*k)$,
where:

SymbsQPSK=$\exp(i*(\pi/4+n*\pi/2))$, where n=[0, 1, 2, 3],
NDALength: length over which the blind frequency estimate is produced. NDALength is fixed at 8370 when the SNR is 0 dB,
BABG: additive white Gaussian noise,
$\Delta_f$: Doppler frequency to be estimated.

The frequency estimate $\widetilde{\Delta fNDA}$ at the second estimation module or estimator is effected as follows:

$$\widetilde{\Delta fNDA} = \frac{MaxIndexNDA(|DFT((R(k)+BABGq(k))^4)|^2)}{4} =$$

$$\frac{MaxIndexNDA\left(\left|\begin{array}{c}DFT(e^{i*2*\pi*4*\Delta_f*t}*rect_{NDALength}(t)+\\ BABGq(t))\end{array}\right|^2\right)}{4} =$$

$$\frac{MaxIndexNDA(|sinc_{NDALength*\pi}(f-4*\Delta_f)+BABGq(f)|^2)}{4}$$

where:
Rect$_{NDALength}$(t): rectangle function of length NDALength,
Sin $c_{NDALength}*_\pi(f)$:cardinal sine function of width NDALength*π,
BABGq(f): equivalent additive white noise stemming from raising to the power of 4 the noisy signal SymbsQPSK+BABG,
MaxIndexNDA: frequency belonging to the frequency range FreqRangeNDA for which the norm of the Fourier transform is at a maximum.

The maximum range of operation is +−0.125*$R_s$, because it is a blind estimator that takes a signal raised to the power of 4 as its input.

FIG. 5 schematically shows a structure for a frequency estimator according to the invention that is implemented, by way of example, at the DVB-S2 receiver of the ground station, which has two modules (a supervised correlation device, a blind correlation device) adapted to performing the following steps:

firstly, rough supervised estimation of the frequency is effected on the DVB-S2 header of 90 symbols: a first frequency estimate having a precision of +−2.5 kHz (for an Rs of 1 Msps) is then obtained;

secondly, a blind correlation is effected on the 8370 symbols of the short QPSK frame over a range of +−2.5 kHz from the rough frequency estimation. An estimation having a precision of 20 Hz is then obtained for the frequency error.

The use of the blind estimator over a reduced frequency range allows the FER owing to the blind estimator to be divided by the ratio between the total range of operation of the estimator and this reduced range. Thus, in the present case, the range of operation of the estimator being +/−125 kHz, the FER is divided by 50 (125/2.5=50). This allows a change from an FER higher than $10^{-5}$ to an FER close to $10^{-6}$ at 0 dB.

The frequency estimator implemented according to the present invention allows an FER lower than $10^{-5}$ to be attained at 0 dB under adverse aeronautical conditions. For signal-to-noise ratio values SNRs higher than 0 dB, it is possible to obtain the same level of performance while reducing the magnitude of the blind estimation.

The steps of the method that just been described apply in the case where the length over which the frequency is estimated corresponds to $$NDALength = \frac{8370}{SNRLin^2}$$

(where SNRL in corresponds to the signal-to-noise ratio SNR expressed linearly), the performance (FER lower than $10^{-5}$ (frequency error rate) under worst-case aeronautical Doppler conditions) being the same for SNRs typical of DVB-S2 QPSK (between 0 and 7 dB).

Advantages

The invention notably has the advantage of providing an estimate of the frequency very precisely over a very short estimation period, which allows very large variations in the frequency owing to the movement of the aeroplane to be followed. It can thus be used in totally "bursty" fashion, that is to say that for each DVB-S2 frame a frequency estimate is provided, the latter being independent of the estimate obtained over the previous frame. Thus, if the frequency estimate over a frame is erroneous, this does not impact on the other frames and the loss is limited to the frame for which the estimate is erroneous.

The invention claimed is:

1. A method for estimating a frequency value for aeronautical communication between a first station and an airborne system moving in relation to the first station, data being transmitted in a form of a succession of frames, a frame comprising at least one first header field of known data followed by one or more fields of unknown data, at least one of the first station and the airborne system comprising a radiocommunication receiver, the method comprising at least the following steps being executed by the radiocommunication receiver:

Step 1: performance of a supervised correlation on the known data of the header by the radiocommunication receiver, and estimation of a first frequency range centered on an estimated frequency $\widehat{\Delta fDA}$ having a precision of $+/-\widetilde{\Delta f}$ by the radiocommunication receiver, and Step 2: production of a blind correlation on at least all of the unknown data of a field of data by the radiocommunication receiver, by looking for a correlation peak over the range centered on the frequency $\widehat{\Delta fDA}$ +/− $\widetilde{\Delta f}$, as determined in step 1, and by retaining the frequency corresponding to the correlation peak, said retained frequency being used for transmitting data between the first station and the airborne system, wherein the frame is modulated with a modulation by change of phase comprising a field of pilots ($302_1$) that is arranged before a field of data and in that it has at least the following steps:

Step 1: performance of a supervised correlation by Fourier transform on the field of pilots ($302_1$), in order to obtain a range centered on an estimated frequency $\widehat{\Delta fDA}$ having a precision of $+/-\widetilde{\Delta f}$, and Step 2: use of the symbols of the modulated frame and use of the Fourier transform from the modulated symbols of the short frame, corresponding to the range centered on the frequency $\widehat{\Delta fDA}$ +/− $\widetilde{\Delta f}$ defined in step 1, determination of the frequency corresponding to the maximum of the norm of the Fourier transform and deduction of the value of the Doppler effect therefrom.

2. The method according to claim 1, wherein the frame is a frame of DVB-S2 type using a DVB-S2 QPSK type modulation t.

3. The method according to claim 2, wherein it comprises at least the following steps:

Step 1: estimation of the frequency $\widehat{\Delta fDA}$, $$\widehat{\Delta fDA} = MaxIndex(|DFT(R(k) * conj(Ref(k)) + BABG(k))|^2) =$$
$$MaxIndex(|DFT(e^{i*2*\pi*\Delta_f*t} * rect_{90}(t) + BABG(t))|^2) =$$
$$MaxIndex(|sinc_{90*\pi}(f - \Delta_f) + BABG(f)|^2)$$

where:
conj( ) conjugate function of a complex number
DFT: Fourier transform
k: index of a symbol
t: given instant
$\Delta_f$: Doppler frequency to be estimated
$rect_{90}(t)$: rectangle function of length 90
sin $c_{90*\pi}(f)$: cardinal sine function of width 90*π
Ref(k): reference symbols for the received symbols R(k) of the header where 1≤k≤90
BABG: additive white Gaussian noise Step 2: estimation of the value of the Doppler from the expression $$\widehat{\Delta fNDA} = \frac{MaxIndexNDA(|DFT((R(k) + BABGEq(k))^4)|^2)}{4} =$$

-continued $$\frac{MaxIndexNDA\left(\left|DFT\begin{pmatrix}e^{i*2*\pi*4*\Delta_f*t}*rec_{INDALength}(t)+\\BABGEq(t))\end{pmatrix}\right|^2\right)}{4} =$$

$$\frac{MaxIndexNDA(|sinc_{NDALength*\pi}(f-4*\Delta_f)+BABGEq(f)|^2)}{4}$$

where:
NDALength: length over which the blind frequency estimate is produced,
$Rect_{NDALength}(t)$: rectangle function of length NDA-Length, $sinc_{NDALength*\pi}(f)$: cardinal sine function of width NDALength*$\pi$,
BABGEq(f): equivalent additive white Gaussian noise stemming from raising to the power of 4 the noisy signal SymbsQPSK+BABG,
MaxIndexNDA: frequency belonging to the frequency range FreqRangeNDA for which the norm of the Fourier transform is at a maximum.

4. The method according to claim 3, wherein the frame is modulated by BPSK or QPSK modulation.

5. The method according to claim 4, wherein the value of NDALength is fixed at 8370 for an SNR of 0 dB.

6. The method according to claim 5, wherein the value of NDALength is equal to $$\frac{8370}{SNRLin^2},$$

where SNRLin corresponds to the signal-to-noise ratio SNR expressed linearly.

7. The method according to claim 2, wherein the frame is modulated by BPSK or QPSK modulation.

8. The method according to claim 7, wherein the value of NDALength is fixed at 8370 for an SNR of 0 dB.

9. The method according to claim 8, wherein the value of NDALength is equal to $$\frac{8370}{SNRLin^2},$$

where SNRLin corresponds to the signal-to-noise ratio SNR expressed linearly.

10. The method according to claim 2, wherein a frequency estimate is determined for each DVB-S2 frame constituting the communication.

11. A device for estimating a Doppler in an aeronautical communication system comprising at least a first station and an airborne system moving in relation to the first station, data being transmitted in a form of a succession of frames, a frame comprising at least one first header field of known data followed by one or more fields of unknown data, the device comprising at least:
a radiocommunication receiver implemented with a first module configured to produce a supervised correlation on the known data of the header, and to estimating a first frequency range centered on an estimated frequency $\widehat{\Delta fDA}$ having a precision of +/− $\widehat{\Delta f}$, and
the radiocommunication receiver further implemented with a second module configured to produce a blind correlation on at least all of the unknown data of a field of data, by looking for a correlation peak over the range of said estimated frequency $\widehat{\Delta fDA}$ +/− $\widehat{\Delta f}$, and by retaining the frequency corresponding to the correlation peak, said retained frequency being used for transmitting data between the first station and the airborne system, wherein the frame is modulated with a modulation by change of phase comprising a field of pilots ($302_1$) that is arranged before a field of data and in that it has at least the following steps:
Step 1: performance of a supervised correlation by Fourier transform on the field of pilots ($302_1$), in order to obtain a range centered on an estimated frequency $\widehat{\Delta fDA}$ having a precision of +/− $\widehat{\Delta f}$, and
Step 2: use of the symbols of the modulated frame and use of the Fourier transform from the modulated symbols of the short frame, corresponding to the range centered on the frequency $\widehat{\Delta fDA}$ +/− $\widehat{\Delta f}$ defined in step 1, determination of the frequency corresponding to the maximum of the norm of the Fourier transform and deduction of the value of the Doppler effect therefrom.

12. The device according to claim 11, wherein the frames are QPSK- or BPSK-modulated DVB-S2 data.

13. The device according to claim 11 wherein the first estimation module and the second module are produced using FPGA technology.

14. A device for estimating a Doppler in an aeronautical communication system comprising at least a first station and an airborne system moving in relation to the first station, data being transmitted in a form of a succession of frames, a frame comprising at least one first header field of known data followed by one or more fields of unknown data, the device comprising at least:
a radiocommunication receiver implemented with a supervised correlation device for the known data of the header, and to estimating a first frequency range centered on an estimated frequency $\widehat{\Delta fDA}$ having a precision of +/− $\widehat{\Delta f}$, and
the radiocommunication receiver further implemented with a blind correlation device for at least all of the unknown data of a field of data, by looking for a correlation peak over the range of said estimated frequency $\widehat{\Delta fDA}$ +/− $\widehat{\Delta f}$, and by retaining the frequency corresponding to the correlation peak, said retained frequency being used for transmitting data between the first station and the airborne system, wherein the frame is modulated with a modulation by change of phase comprising a field of pilots ($302_1$) that is arranged before a field of data and in that it has at least the following steps:
Step 1: performance of a supervised correlation by Fourier transform on the field of pilots ($302_1$), in order to obtain a range centered on an estimated frequency $\widehat{\Delta fDA}$ having a precision of +/− $\widehat{\Delta f}$, and
Step 2: use of the symbols of the modulated frame and use of the Fourier transform from the modulated symbols of the short frame, corresponding to the range centered on the frequency $\widehat{\Delta fDA}$ +/− $\widehat{\Delta f}$ defined in step 1, determination of the frequency corresponding to the maximum of the norm of the Fourier transform and deduction of the value of the Doppler effect therefrom.

* * * * *